United States Patent
Bauer et al.

(10) Patent No.: US 7,137,072 B2
(45) Date of Patent: Nov. 14, 2006

(54) METHOD AND SYSTEM FOR MANAGING DOCUMENTS MODIFIED WHILE BEING VIEWED IN A BROWSER WINDOW

(75) Inventors: Mathias Bauer, Hamburg (DE); Thorsten O. Laux, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 828 days.

(21) Appl. No.: 10/271,568

(22) Filed: Oct. 17, 2002

(65) Prior Publication Data

US 2003/0088831 A1 May 8, 2003

(51) Int. Cl.
*G06F 3/00* (2006.01)
*G06F 15/16* (2006.01)

(52) U.S. Cl. ............... 715/809; 715/748; 715/511; 715/530

(58) Field of Classification Search ............. 715/809, 715/808, 748, 740, 738, 511, 530, 531; 719/318, 719/328; 709/201, 203
See application file for complete search history.

(56) References Cited

U.S. PATENT DOCUMENTS

| | | | |
|---|---|---|---|
| 5,608,898 A * | 3/1997 | Turpin et al. ............... 707/201 |
| 5,890,176 A | 3/1999 | Kish et al. .................. 707/511 |
| 5,966,512 A * | 10/1999 | Bates et al. ............. 709/201 X |
| 6,067,541 A | 5/2000 | Raju et al. ..................... 707/3 |
| 6,067,551 A * | 5/2000 | Brown et al. ............... 707/203 |
| 6,182,086 B1 * | 1/2001 | Lomet et al. ........... 707/203 X |
| 6,185,574 B1 | 2/2001 | Howard et al. ............. 707/200 |
| 6,535,996 B1 * | 3/2003 | Brewer et al. ................ 714/14 |
| 6,662,209 B1 * | 12/2003 | Potts et al. ................. 709/203 |
| 6,748,403 B1 * | 6/2004 | Lemke ....................... 707/202 |

OTHER PUBLICATIONS

"Unsaved Changes Tool for Object-Oriented Environment", IBM Technical Dislosure Bulletin, vol. 33 No. 12, May 1991, pp. 304-305.*
Mansfield, Mastering Word 97 Fourth Edition, Sybex 1997, pp. 34-38, 49-50.*

* cited by examiner

*Primary Examiner*—Raymond J. Bayerl
(74) *Attorney, Agent, or Firm*—Sonnenschein Nath & Rosenthal LLP

(57) ABSTRACT

A method and system are provided for managing files which are modified while the contents of the files are being viewed in a browser window in a data processing system. During execution of the browser, if a request to close a window in the browser is received, it is determined whether a file which was displayed in the window was modified since a last save operation for the file. If the file was modified, and the file had not been saved with the modifications, then an indicator of the modified file is included in a modification list with a reference to enable access to the modified file. The modification list is then sent to a user of the file so that the user may select options for saving the modified file, discarding the modifications, or resuming editing of the file. Thus, integrity of file modifications is enhanced.

22 Claims, 6 Drawing Sheets

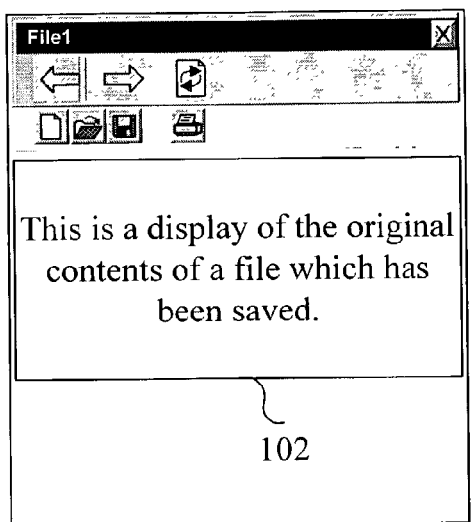
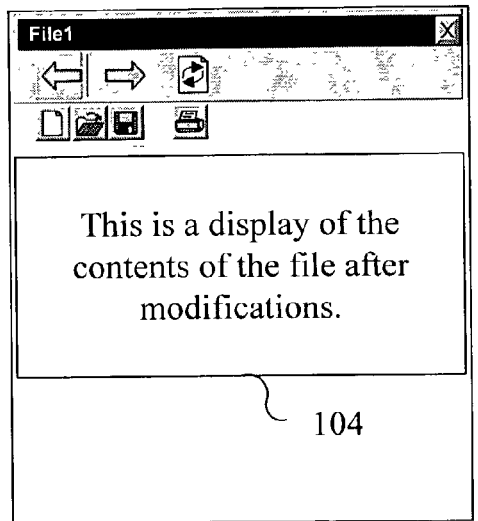
FIG. 1a
FIG. 1b
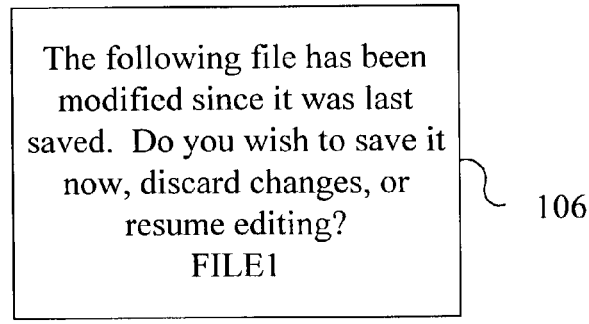
FIG. 1c

METHOD AND SYSTEM FOR MANAGING DOCUMENTS MODIFIED WHILE BEING VIEWED IN A BROWSER WINDOW

CROSS REFERENCE TO RELATED APPLICATION

This application is related to, and claims priority to, European Patent Application No. 01 124 298.9, filed on Oct. 18, 2001, commonly owned, and entitled "Managing Modified Documents," and which is hereby incorporated by reference herein in its entirety.

BACKGROUND

1. Field of the Invention

The present invention generally relates to data processing systems. More particularly, this invention relates generally to a method and system for managing files which are modified while the contents of the files are being viewed in a browser window in a data processing system.

2. Background of the Invention

Data processing devices are used for a wide range of versatile applications, providing services which may range from editing of text documents or spreadsheet applications to complex software systems, for example, for computer aided design or manufacturing, purchasing, computer aided banking applications, entertainment applications, and numerous other application areas. Increasingly complex software applications are employed in the field of personal services, for example, for personal data organization and mobile communication applications such as mobile telephones or hand-held computing devices, or communication services and other services provided over computer networks, such as the Internet.

As more elements are included in computer aided applications and as more computing devices are involved in providing a particular service, for example, over a computer network, it becomes more important to ensure that all elements of the computerized application know about relevant operations and statuses of the other elements of the application.

For applications involving a plurality of data processing devices cooperating with one another, a user may input instructions at one data processing device for effecting operations at another data processing device. Further, in a complex application executed on a single data processing device, one element of the application may issue an instruction to another element of the application to perform certain services. In any of these cases, it is important that all elements of the application or data processing devices are aware of these commands or operations.

As an example, if a user of a text processing application or another type of service application selects a text document and issues an instruction to open the document, the text processing application may obtain and effect a display of the document. The user may then edit this document using a graphical user interface. For example, a user may enter text through a keyboard, while reviewing the changes to the text document on a display. Periodically, or after the last modifying operation, the user may choose to save the text document.

If, however, during editing and before saving changes to the text document, the user decides to interrupt the text editing operations by terminating the processing of the document, by launching another application, or by performing any other activity, it is desirable to notify the text processing application regarding this new activity of the user, i.e., that the text editing operation has been interrupted or terminated. The text processing application may then either remain active in the background, invisible to the user, awaiting renewed activation, or may be terminated.

If the application is terminated, it is desirable to provide the user with an option to either save the modifications to the text document, to discard the modifications, or to resume editing of the text document, i.e., to abort the termination procedure.

While the above functionality can be implemented in a "closed" environment, such as within an application executing with an operating system on a personal computer, where all applications and interactions can be easily tracked, implementing the functionality described above may be difficult in distributed applications such as applications which are carried out using a plurality of data processing devices in a computer network. In the above example, if a user interacts with the text processing application through a graphical user interface residing on one data processing device, while the main part of the text processing application is located on another data processing device, the user could intentionally or accidentally terminate the graphical user interface part of the application during an editing process before saving changes to the text document, in which case the modifications may be lost, or forcedly saved without offering the user any options. This problem may be particularly severe in distributed applications involving the Internet, or any computer network, where communications between data processing devices controlling parts of an application, such as the above text processing application or applications involving distributed databases, could be interrupted, or where the parts of the application could be independently terminated.

Therefore, a need has long existed for a method and system that overcome the problems noted above and others previously experienced.

SUMMARY OF THE INVENTION

Methods and systems consistent with the present invention provide a method and system for managing files which are modified while the contents of the files are being viewed in a browser window in a system. The files are typically located remotely with respect to the system in which the browser runs and are accessed via a network. During execution of the browser, if a request to close a window in the browser is received, it is determined whether a document which was displayed in the window was modified since a last save operation for the file containing the document in secondary storage. If the document was modified, and the file had not been saved with the modifications, then an indicator of the modified document and file is included in a modification list with a reference to enable access to the modified document. The modification list includes indicators of all files which have been modified since a last save operation for the files, and may include names of the files and links or references for accessing the files. The modification list is then sent to a user of the file, for example, in a separate window so that the user may select options for saving the modified document, discarding the modifications, or resuming editing of the document, thus enabling maintenance of information on all data files which were modified during a session, thereby eliminating a need for all elements of a distributed system to know about respective modified data files. The modification list contains information on data files which have been modified but have not been saved with the modifications, so that, if parts of a user application are intentionally or accidentally terminated, the user or another application may decide at a later point in time how to proceed with the modifications. Thus, integrity of modifications to file contents is enhanced.

In accordance with methods and systems consistent with the present invention, a first method in a data processing system having a browser is provided, the method comprising the steps of displaying contents of a file in a window of the browser such that the contents of the file are reflected by the displayed contents; receiving user input to modify the contents of the file such that the contents of the file no longer are reflected by the modified displayed contents; receiving user input to close the window when the contents of the file no longer are reflected by the modified displayed contents; and displaying an indication that the contents of the file no longer are reflected by the modified displayed contents.

In accordance with methods and systems consistent with the present invention, a first data processing system for managing modified documents and having a browser is provided, the system comprising a memory comprising a document management system that transmits data for displaying contents of a file in a window of the browser such that the contents of the file are reflected by the displayed contents; receives input from a user to modify the contents of the file such that the contents of the file no longer are reflected by the modified displayed contents; receives an indication that the window is closing when the contents of the file no longer are reflected by the modified displayed contents; and transmits data for displaying an indication that the contents of the file no longer are reflected by the modified displayed contents; and a processor for running the document management system.

In accordance with methods, systems and articles of manufacture consistent with the present invention, a first computer-readable medium is provided, the computer-readable medium encoded with instructions that cause a data processing system having a browser to perform a method comprising the steps of transmitting data for displaying contents of a file in a window of the browser such that the contents of the file are reflected by the displayed contents; receiving input from a user to modify the contents of the file such that the contents of the file no longer are reflected by the modified displayed contents; receiving an indication that the window is closing when the contents of the file no longer are reflected by the modified displayed contents; and transmitting data for displaying an indication that the contents of the file no longer are reflected by the modified displayed contents.

A log unit, which may be implemented as a determination module or which may be a module within an object which contains the modification list data, may be configured to record an identifier of the modified data file in the modification list and to present the modification list to a user upon detecting the modified data file. Accordingly, the user may view the list of the modified data files, in order to maintain an overview of all modified data files. The identifier may include a link to the modified data file, allowing a user to select the identifier in order to access the modified data file, for example, if a display window displaying the modified data file was discarded or otherwise lost.

A service application may be configured to communicate with a browser for browsing through data in a network of data processing devices. Thus, the data files may be handled remotely in connection with a browser. The identifier may include a file name of the modified data file and the link to the modified data file may include a URL. Accordingly, the user may view, in the modification list, file names of the modified data files and may access the modified data files over a network such as the Internet, using the link associated with the identifier, if a window displaying the modified data file was terminated or discarded.

Additionally, the log unit may be configured to effect display of the modification list in a subframe on a display, or as a pop-up window, for example, via communication with a visualization module. Thus, the user may handle the modification list as a regular display window for improved user interaction.

In association with the display of the modification list by the subframe, the log unit may further be configured to offer user options to perform at least one of the operations of saving the at least one modified data file, discarding the changes of the at least one modified data file, discarding the entire at least one modified data file, and continuing to modify the at least one data file. Thus, a user receives enhanced control with respect to saving or discarding the modifications.

The log unit may also be configured to display the subframe with the modification list as a floater window or browser window, and, upon receiving notification of a terminate instruction, to execute one of saving modifications of the at least one modified data file and discarding modifications of the modified file. Thus, if the modification list is displayed in a floater window, or a browser window, i.e., a window which is associated with an application program, the user may pre-define a default save operation or a default operation to discard modifications upon terminating or removing the modification list.

The log unit may be configured to save all modified documents upon detection of a terminate instruction in a separate memory area, and may be configured to include all modified documents in the modification list upon a later restart operation. Thus, for example, upon detection of an unexpected communication breakdown, all modified documents may be saved in an emergency save operation while leaving the original data file unchanged, and, upon detection of a restart operation, the modification list with the modified documents may again be displayed for user interaction. The user may thus decide at a later point in time, for example, after re-establishing communications, to save or discard modifications.

Further, the log unit may be configured to display the subframe with the modification list as a system window, and, upon detection of a terminate instruction, to offer user options including at least one of saving modifications of the at least one modified data file, discarding modifications of the at least one modified data file, and resuming modifications to the data file. Thus, by displaying the modification list as a system window, i.e., linked to the operating system, the user may be provided with the option to save or discard the modifications.

The log unit, upon a log-out instruction for ending a work session, may be configured to prompt a user to request one of saving modifications of the at least one modified data file, discarding modifications of the modified data file, and resuming modifications to the data file. Thus, even if the user issues a log-out instruction, the user may decide how to handle the unsaved modifications.

The service application may be located at a server site and may remotely communicate with a client site. Thus, the system may be configured as a server and client system, for example, for using network applications. The data files may be located at the server site and may be remotely handled by a user operating the client site. Thus, a user may interact with the server, storing the data files through the client's site, for example, for editing operations.

The log unit may be configured to maintain a subframe with the modification list active, if a subframe at the client unit displaying the modified data file is terminated, and to open a subframe with the modified data file at the client unit upon the client's selection of the link to the modified data file. Thus, even if the modified data file is discarded, as the modification list remains active, the modified document may be again retrieved upon a corresponding selection operation.

According to another example, a method for handling a plurality of data files includes detecting at least one modified data file which was modified since a last saving operation, and maintaining a modification list with an identifier for each of the at least one modified data file.

Further, a program may be provided, having instructions adapted to carry out the above operations. Additionally, a computer-readable medium may be provided, in which a program is embodied, wherein the program causes a computer execute the operations outlined above. Also, a computer program product comprising the computer-readable medium may be provided.

Other apparatus, methods, features and advantages consistent with the present invention will be, or will become, apparent to one with skill in the art upon examination of the following figures and detailed description. It is intended that all such additional systems, methods, features and advantages be included within this description, be within the scope of the present invention, and be protected by the accompanying claims.

BRIEF DESCRIPTION OF THE DRAWINGS

FIGS. 1a–1c depict exemplary windows suitable for use with methods and systems consistent with the present invention.

DETAILED DESCRIPTION

Figure 2:
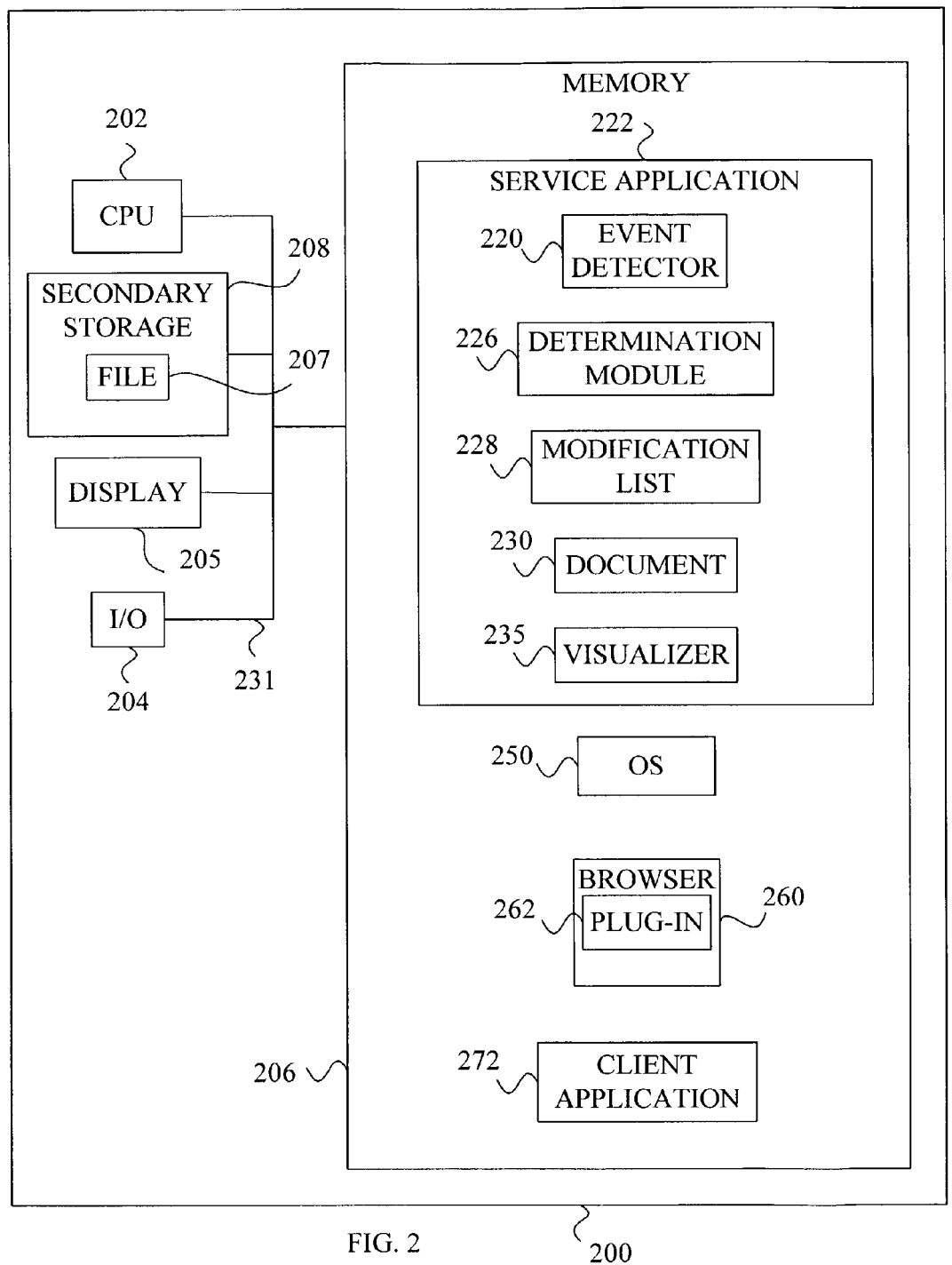
FIG. 2 depicts a block diagram of an exemplary data processing system suitable for practicing methods and implementing systems consistent with the present invention.

Methods and systems consistent with the present invention provide a method and system for managing files which are modified while the contents of the files are being viewed in a browser window in a system. The files are typically located remotely with respect to the system in which the browser runs and are accessed via a network. During execution of the browser, if a request to close a window in the browser is received, it is determined whether a document which was displayed in the window was modified since a last save operation for the file containing the document in secondary storage. If the document was modified, and the file had not been saved with the modifications, then an indicator of the modified document and file is included in a modification list with a reference to enable access to the modified document. The modification list includes indicators of all files which have been modified since a last save operation for the files, and may include names of the files and links or references for accessing the files. The modification list is then sent to a user of the file, for example, in a separate window so that the user may select options for saving the modified document, discarding the modifications, or resuming editing of the document, thus enabling maintenance of information on all data files which were modified during a session, thereby eliminating a need for all elements of a distributed system to know about respective modified data files. The modification list contains information on data files which have been modified but have not been saved with the modifications, so that, if parts of a user application are intentionally or accidentally terminated, the user or another application may decide at a later point in time how to proceed with the modifications. Thus, integrity of modifications to file contents is enhanced.

Reference will now be made in detail to an implementation in accordance with methods, systems and articles of manufacture consistent with the present invention as illustrated in the accompanying drawings. The same reference numerals may be used throughout the drawings and the following description to refer to the same or like parts.

FIGS. 1a–1c depict exemplary browser windows 102 and 104 in a browser 100, and a window 106 suitable for use with methods and systems consistent with the present invention. For this example, it is assumed that a user has accessed a service application, such as a text processing application, and has opened a file named "File1" containing a document, the contents of which are displayed on a browser window for viewing and editing by the user, though the file may be located remotely, across the network. The browser window 102 depicts a display of contents of a file which has been saved. The user may then edit the contents via input devices such as a mouse and keyboard. The browser window 104 depicts a display of contents of a file after modifications which a user has made on-screen, and which has not yet been saved. For this example, it is now assumed that the window 104 is terminated, either by the user exiting the window and/or the browser (e.g., by clicking on the "x" in the upper right corner of the display or by clicking on the left arrow or right arrow to go backward or forward in viewing history).

The service application then generates an indicator indicating that the contents of "file1" have been modified since a last save operation on the file. The window 106, which may be a pop-up window or other type of display, is displayed for the user at some later point in time, to indicate to the user that the file was modified and not saved, additionally offering to the user at least one option for handling the modifications that were made to the file. For this example, the user receives the options of saving the file as modified, discarding the changes, or resuming the editing of the file.

FIG. 2 depicts a block diagram of an exemplary data processing system 200 suitable for practicing methods and implementing systems consistent with the present invention. The data processing system 200 includes a central processing unit (CPU) 202, an input-output (I/O) device 204, a memory 206, and a secondary storage device 208 which contains a file 207. The data processing system 200 may further include input devices such as a display 205, a keyboard, a mouse, or a speech processor (not shown). The elements of the data processing system 200 may communicate with each other via a bus 231.

The memory 206 embodies a service application 222, an operating system 250, a client application 272, and a browser 260, which may communicate with each other, for example, via message passing or function calls. The service application 222 may be a process for handling and maintaining files, such as a word processing application for modifying text files, a spreadsheet application, or a graphic application. As an example, StarOffice™, which is a known and commercially available product of Sun Microsystems, Inc., may be used as the service application 222. Documentation regarding APIs for StarOffice™ are available for download from http://api.openoffice.org. The service application 222 may also be included as a web based application in Webtop, which is a product of Sun Microsystems, Inc.

The client application 272 communicates with the plug-in 262 and the service application 222 to enable display of visualization data, which is transmitted from the visualizer 235, on the browser 260. The service application 222 further includes a determination module 226, a modification list 228, an event detector 220, a visualizer 235, and a document 230. The browser 260 includes at least one plug-in 262.

A browser generally may be any program or group of application programs allowing convenient browsing to information or data available in distributed environments such as on the Internet or any other network including local area networks. A browser application generally enables viewing, downloading data, and transmitting data between data processing devices. Further, a browser, appropriately configured or equipped with appropriate application modules, or plug-ins, may be enhanced with further functionality to access or process specific kinds of information available in a distributed system such as text documents, video information, audio information or any other kind of information in specialized formats.

A plug-in may generally be a software module which may be added to any kind of hosting software application, such as a browser, a text processing application, or any other service application. A plug-in adds a defined functionality to the hosting software application, for example, visualization capabilities for certain types of documents or specific processing capabilities. A plug-in may be added to the hosting software application at any desired time, provided that the hosting software application is equipped to receive and integrate the plug-in. The code for the plug-in may be obtained from any source, such as via a computer network or from a data storage medium. Alternatively, a plug-in may also be a hardware unit adding functionality to an application or hosting hardware structure.

The event detector 220 may be a process that listens for predetermined events to occur, and that may send messages to other processes or programs that have requested notification of event occurrences. For example, the event detector 220 may listen for an event of a browser terminating or closing a window, and, upon detection of the event, may send a message to processes and programs that have requested notification. The service application 222 may be a process for handling data files, such as a word processing application which is used for modifying text files. The determination module 226 may be a sub-process for determining whether an event has occurred via communication with the event detector 220. The document 230 may be a document which is being processed by the service application 222, for example, the file may be a text file which is processed by a word processor, and the document may be stored in the secondary storage 208 in the file 207. The modification list 228 may include a list which includes indicators of files which have been modified since a last save operation.

The visualizer 235 may be a process which tracks the current status of the document 230 as it is being processed by the service application 222, and which generates visualization data, for example, in the form of frames, to be transmitted to the browser 260 for viewing by a user, as shown, for example, in FIGS. 1a–1b. The plug-in 262 may be configured to display, for a user, on the display 205, the data transmitted by the visualizer 235. The client application 272 communicates with the service application 222 and the plug-in 262 to enable the communications of data between the browser 260 and the service application 222. Thus, the user may view the contents of the document 230 as it is being processed, for example, as it is being modified by a word processor.

The client application 272 may be implemented as a process configured to establish a connection between itself and the service application 222 for communicating modification data from the browser 260 to the service application 222 and visualization data from the visualizer 235 to the plug-in 262, the browser 260, or to a pop-up window or other type of display which may also be generated by the client application.

When a user decides to view or modify the document 230, the user may activate the browser 260 and request the document 230. The plug-in 262 then activates the client application 272, which handles visualization of visualization data sent to the client application 272 by the visualizer 235 so that the client application 272 may provide the visualization information to the plug-in 262 for display to the user. When the user terminates a viewing window, the client application 272 may maintain communication with the service application 222 so that the client application 272 may later display the modification list 228 to the user either as a new window in the browser 260 or as a separate display, providing the use with the capability to select a file for further processing options.

If the user chooses to save the document 230 with the modifications which have been made in an editing session, the document may be stored in the file 207 contained in the secondary storage device 208. Additionally, in the event of an emergency or other need to save intermediate data such as the unsaved modification data, the intermediate data such as the contents of the modification list 228 may also be stored in the secondary storage device 208.

Figure 3:
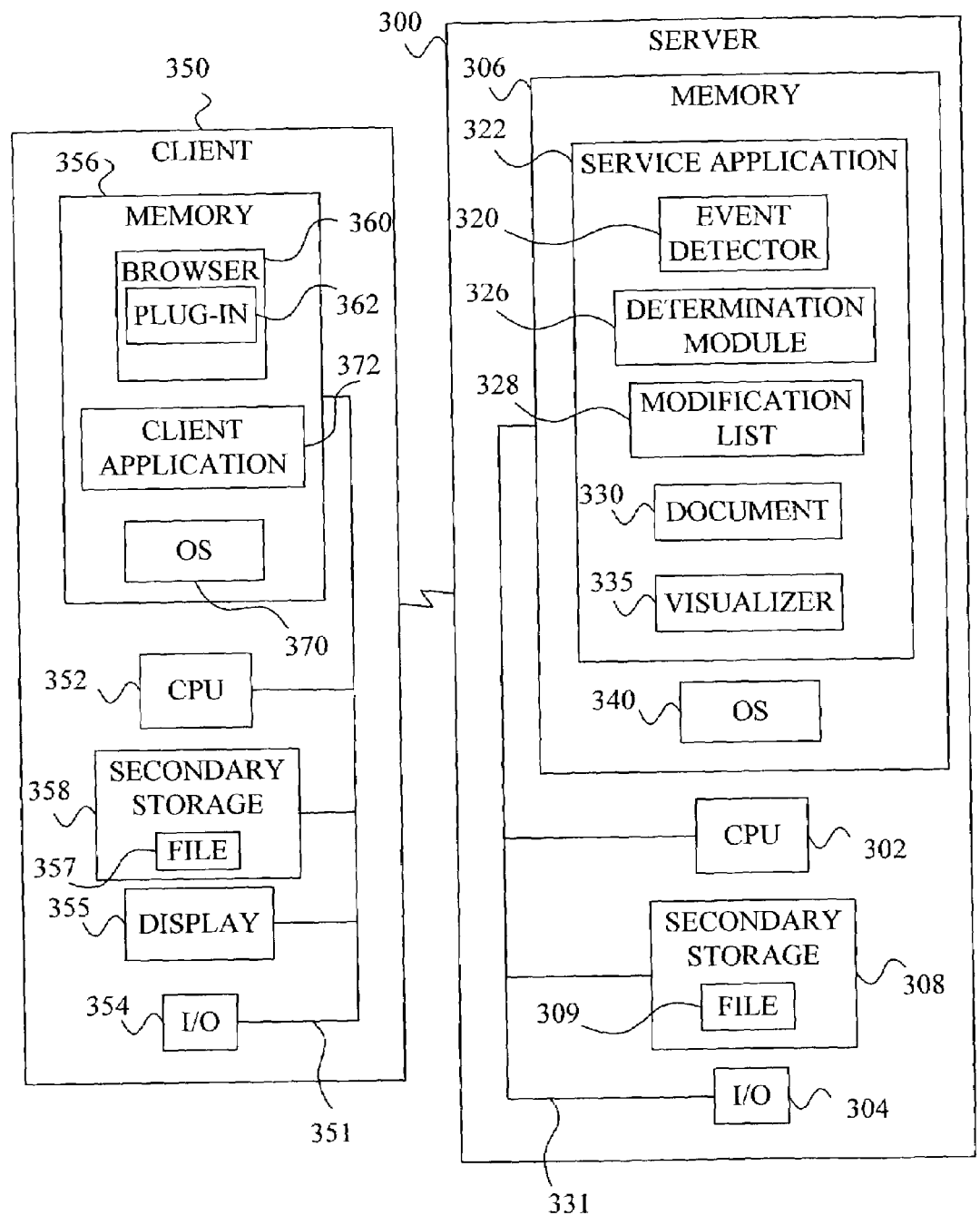
FIG. 3 depicts a block diagram of an exemplary data processing system including a client and server suitable for practicing methods and implementing systems consistent with the present invention.

FIG. 3 depicts a block diagram of an exemplary data processing system including a client 350 and a server 300 suitable for practicing methods and implementing systems consistent with the present invention. The client 350 may include a human user or may include a user agent. The term "user" as used herein refers to a human user, software, hardware, or any other entity using the system.

The client 350 includes a central processing unit (CPU) 352, an input-output (I/O) device 354, a memory 356, and a secondary storage device 358, which includes a file 357. The client 350 may further include input devices such as a display 355, a keyboard, a mouse or a speech processor (not shown). The elements of the client 350 may communicate with each other via a bus 351. The memory 356 embodies an operating system 370, a client application 372, and a browser 360. The browser 360 includes at least one plug-in 362.

The server 300 includes a central processing unit (CPU) 302, an input-output (I/O) device 304, a memory 306, and a secondary storage device 308 which contains a file 309. The server 300 may further include input devices such as a keyboard, a mouse or a speech processor (not shown). The elements of the server 300 may communicate with each other via a bus 331.

The memory 306 embodies a service application 322 and an operating system 340. The service application 322 further includes an event detector 320, a determination module 326, a modification list 328, a document 330, and a visualizer 335.

The event detector 320, service application 322, determination module 326, modification list 328, document 330 and visualizer 335 have functionality similar to the functionality described previously. The client 350 and the server 300 may communicate with each other through communication networks which include a large number of computers, such as local area networks or the Internet. Access to information located in either the client 350 or the server 300 may be obtained through wireless communication links or fixed wired communication links or any other communication means. Standard protocols for accessing and/or retrieving data files over a communication link, for example, over a communication network, may be employed, such as a HyperText Transfer Protocol ("HTTP").

For the example depicted by FIG. 3, the client application 372 communicates with the service application 322 to send update information as the document 330 is modified, and receives visualization data from the visualizer 335 to provide the visualization information to the plug-in 362 for display to the user. If a user terminates a window in the browser 360 while the document 330 is being modified, the client application 372 maintains a connection with the service application 322 for later display of the modification list 328 information to the user in a new window or other form of display so that the user may, at a later time, decide whether to save the modified document, resume editing, or discard the modifications. It is pointed out that the service application may be used by a plurality of client applications 372, and/or for editing a plurality of documents 330, so that the modification list 328 may include information regarding a plurality of documents for later transmission to the user.

For example, a connection may be established between the service application 322 and the browser 360 to enable a user to use the service application 322 to process the document 330, for example, by a user selecting a document for editing, and then the plug-in 362 may establish a connection between the client 350 and the server 300. The visualizer 335 may create visualization data for the document contents as the document 330 is being processed, and may stream the visualization data to the client application 372, for the plug-in 362 for display in a window of the browser. The service application 322 may track modifications which are made to the document contents by the interaction of the service application 322 with a user of the browser 360, as shown, for example, in FIGS. 1a–1b. If the user terminates the window, or some other event causes the window to be closed or terminated, the event detector 320 may detect the event that the window is about to be closed, and may send notification of the event to the determination module 326, which may signal the service application 322 to use the connection to retrieve the modifications that have been made to the document 330, but which have not been saved, during the time the window was open for processing of the document contents, before the modifications are discarded.

The service application 322 may then use the connection to open a new window via the client application 372, and request that the visualizer 335 send visualization data to client application 372, and on to the browser 360 to display contents of the modification list 328 (e.g., a list of files that have been modified since a last save operation), and may also open another window to display the file as modified before the window termination event occurred. The user may be offered options such as saving the file with the modifications, discarding the modifications, resuming editing of the file, or discarding the modifications. If the connection is broken (e.g., a device is unplugged or somehow loses a source of power), the information regarding modifications may be saved until a next connection is established. Thus, from a user perspective, when a window is terminated, the contents of a file that was being processed and modified is easily retrieved.

The system shown in FIG. 2 may be implemented, for example, by using StarOffice™, which is a known and commercially available product of Sun Microsystems, Inc., and related products such as Sun One Webtop and OpenOffice.org. The determination module 226 and the modification list 228 may be integrated into the StarOffice™ environment, for example, by using known and available APIs. Documentation regarding such APIs for StarOffice™ are available for download from http://api.openoffice.org. More specifically, documentation regarding the APIs for implementing the event detector 220 and the modification list 228 (e.g., for determining whether certain events have occurred, and for determining whether a file has been modified) as shown in FIG. 2 is available at the URLs (1) http://api.openoffice.org/source/browse/api/api/com/sun/star/awt/XTopWindow.idl?rev=1.1.1.1&content-type=text/x-cvsweb-markup;

(2) http://api.openoffice.org/source/browse/api/api/com/sun/star/awt/XTopWindowListener.idl?rev=1.1.1.1&content-type=text/x-cvsweb-markup; and (3) http://api.openoffice.org/source/browse/api/api/com/sun/star/util/XModifiable.idl?rev=1.1.1.1&content-type=text/x-cvsweb-markup.

The client and server system of FIG. 3 may be implemented using similar applications, such as an event detector which accepts registrations from applications which need to receive notification of certain events in a system. When the event detector determines that a particular event has occurred, then notifications are sent to the applications which have registered to receive such notifications. Additionally, a service application may be implemented to track modifications to files which are being processed by applications so that a process that needs information regarding changes which have been made to a particular file may be able to determine the information upon request.

The client application 372 may be implemented as a process configured to establish a connection between itself and the service application 322 for communicating user input from the browser 360 to the service application 322 and visualization data from the visualizer 335 to the plug-in 362, the browser 360, or to a pop-up window or other type of display which may also be generated by the client application 372. The client application 372 may include a code module configured to display visualization data received from the visualizer 335 on the display 355. Remote visualization protocols are known, such as the remote visualization protocols associated with a UNIX X server and a Microsoft Terminal Server. Thus, one skilled in the art of data processing may similarly configure a remote visualization protocol to enable a negotiation of the interaction between two applications such as the service application 322 and the client application 372 as described above.

The plug-in 362 may be configured in the StarOffice™ environment by utilizing APIs available from OpenOffice.org at the URL http://api.openoffice.org/source/browse/api/api/com/sun/star/mozilla/. The interfaces enable a plug-in to communicate with the determination module 326 and the client application 372.

Although aspects of methods and systems consistent with the present invention are described as being stored in memory, one having skill in the art will appreciate that all or part of methods and systems consistent with the present invention may be stored on or read from other computer-readable media, such as secondary storage devices, like hard disks, floppy disks, and CD-ROM; or other forms of ROM or RAM either currently known or later developed. Further, although specific components of the client computer system and the server have been described, one skilled in the art will appreciate that a data processing system suitable for use with methods, systems, and articles of manufacture consistent with the present invention may contain additional or different components.

Figure 4:
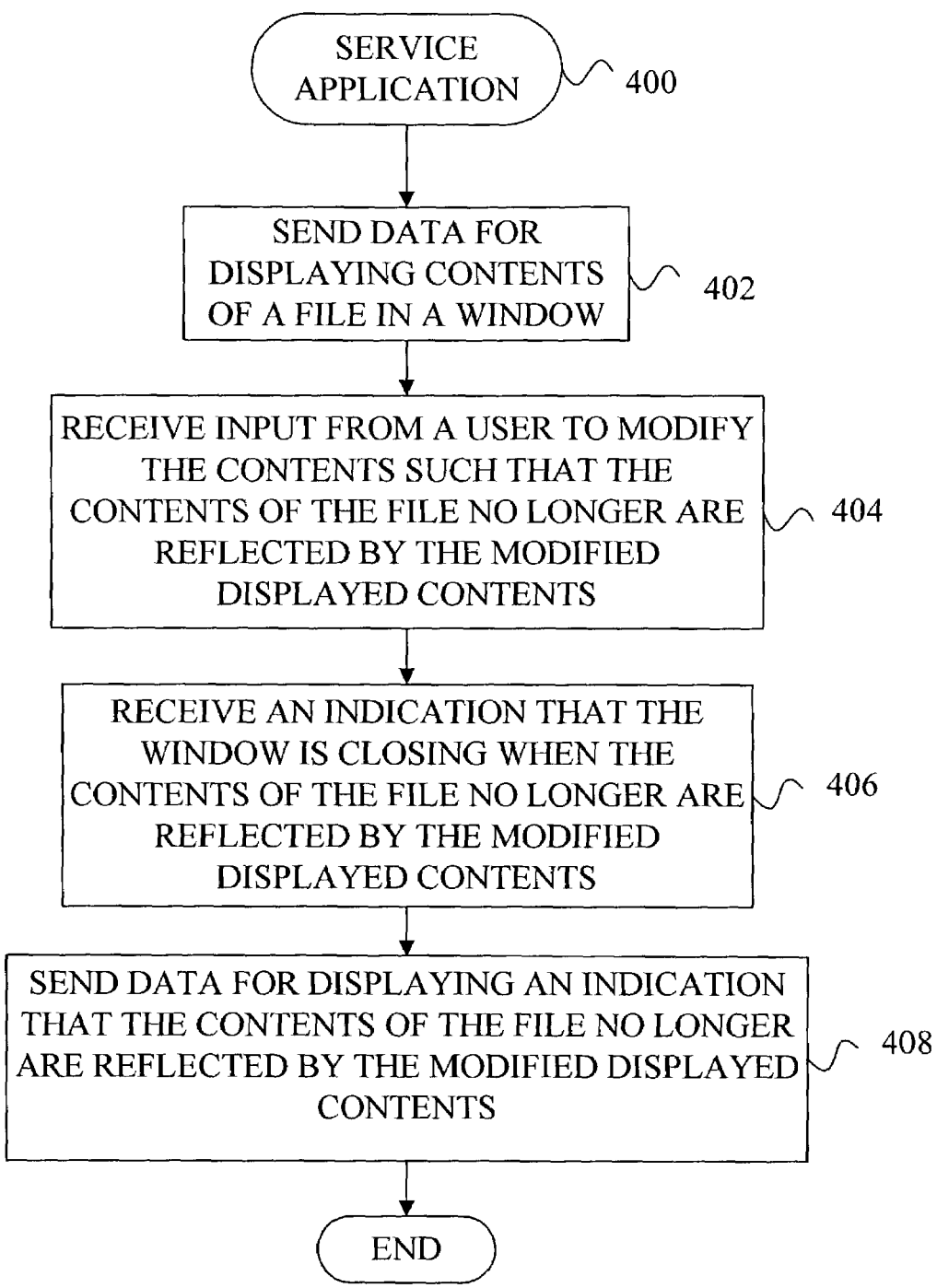
FIG. 4 depicts a flowchart of steps performed by a service application for managing modified files for methods and implementing systems consistent with the present invention.

FIG. 4 depicts a flowchart of steps performed by a service application 400 for managing modified files for methods and implementing systems consistent with the present invention. At step 402, the service application 400 sends data for displaying, by a browser, the contents of a file in a window of the browser. Using the exemplary system of FIG. 2, the visualizer 235 creates and sends the visualization data to the plug-in 262 and the client application 272 for display on the display 205 by the browser 260. At step 404, the service application 400 receives user input to modify the contents of the file such that the contents of the file no longer are reflected by the modified displayed contents. The user inputs information to the browser 260 of FIG. 2, for example, via a keyboard and/or mouse device. The plug-in 262 communicates the information to the client application 272, which may then transmit the information to the service application 222.

In step 406, the service application 400 receives an indication that the window is closing when the contents of the file no longer are reflected by the modified displayed contents. As discussed previously, the event indicator 220 of FIG. 2 sends an indication of the occurrence of an event, such as the closing of a window in a browser, to applications or processes, such as the determination module 226, which have registered to receive notifications of events. In step 408, the service application 400 sends data for displaying an indication that the contents of the file no longer are reflected by the modified displayed contents. As discussed previously, the service application 222 maintains a modification list 228 which includes information regarding files which have been modified since a last save operation on the files. As an example, when the determination module 226 determines that a triggering event has occurred, the service application 222 may request the visualizer 235 to generate and transmit visualization data, including information stored in the modification list 228 and a list of options for handling modified but unsaved files, to the client application 272 to be displayed on the display 205.

The examples described above may enable maintenance of information on all data files which were modified during a session, thereby eliminating a need for all elements of a distributed system to know about respective modified data files. Thus, if parts of an application are intentionally or accidentally terminated, a service application may still maintain information on modified, but unsaved, data files, allowing the user or another application to decide at a later point in time how to handle the modifications.

For example, a user, closing a graphical user interface enabling interaction with a text processing application, may not be able to decide how to handle modifications which were introduced during the interaction, i.e., whether to save or discard the modifications. According to the examples discussed previously, the service application maintains the modification list with all data files which were being modified but which were unsaved, thus enabling the user to decide how to handle the modification at a later point in time. The term "user" as used herein refers to a human user, software, hardware, or any other entity using the system.

By using the modification list including identifiers of the modified, but unsaved, documents or data files, the user may revisit each one of the modified documents at an arbitrary point in time. Upon a corresponding selection of one of the documents or data files of the modification list, the service application may trigger a renewed display of the respective documents or data file and may provide the user with the opportunity to decide on further action. As the modification list provides information on which documents are still open, the examples may provide indicators of what still may be done. More specifically, the user may select a data file of the modification list by clicking on the respective identifier of the data file, triggering a display of the data file, or at least a display of parts thereof. In this case, if an application or a part of an application displaying the respective document was closed earlier, this user operation could trigger a renewed launch of this part of an application related to the display of the data file. If in the above case the part of an application responsible for the display of the data file was only put into a sleep-mode, for example, a window in a closed state, the selection of the respective data file from the modification list could effect reopening the part of the application for displaying the data file from the sleep-mode, for example, open a corresponding frame or subframe on a display.

The user may then decide how to proceed with the modified and unsaved data file, as described previously, including saving modifications, discarding modifications or any other operation. The examples thus facilitate improved management of data files and improved user control.

The system 200 of FIG. 2 or the system 300 and 350 of FIG. 3 may include any kind of data processing device, such as a general purpose data processing device, a plurality of interconnected data processing devices, a mobile computing device, a personal data organizer, or a mobile communication device, including a mobile telephone.

The systems discussed previously may access a plurality of files 207 or 309 through any kind of internal or external communication link. The files 207 or 309 may be stored in an internal memory of a system or in an external memory accessible from the system. For example, the client 350 of FIG. 3 may access the file 309 through communication networks which include a large number of computers, such as local area networks or the Internet. Further, access to the file 309 may be obtained through wireless communication links or fixed wired communication links or any other communication means. Standard protocols for accessing and/or retrieving data files over a communication link, for example, over a communication network, may be employed, such as a HTTP (Hyper Text Transfer Protocol).

Further, the files may be partially stored at an external location such as a memory unit accessible through an external communication link, while other parts of the data files or data associated with the data files may be stored internally to the system, for example, on a hard disc or a RAM. In particular, modifications of a file or a modified copy of a file may be stored in an internal memory of the data processing unit.

The service application, e.g., the service application 322 may detect modification instructions for modifications made to a document 330, and, upon detecting a first modification instruction from a user, the service application 322 may set a modification indicator such as a flag, indicating that the data file has been modified. Similarly, the service application 322 may set a flag if the file was modified by any other operation, such as from another application or through any other event. Further, the modification indicator may be set upon detecting a specific instruction, such as a specific character or editing instruction.

The modification indicator may also be set if editing occurs in predetermined parts of the document, such as in specific areas belonging to the documents or associated with the documents.

If a user or cooperating application then triggers a save operation of the file, instructing a save of the modified file, including the modifications, the modification indicator may be cleared, indicating that the respective file is not modified since a last saving operation. Thus, the service application 322 may mark all files which were modified at all, or which were determined to be modified in accordance with certain rules.

If a renewed modification operation takes place after the save operation, for example as outlined above, the modification indicator may again be set, resulting in treatment of the file as a file modified since a last save operation. In this case, after a save operation, the modified file may disappear from the modification list and reappear on the modification list after a renewed editing or modification operation.

In order to avoid frequent disappearance and reappearance of a file in the modification list in connection with frequent save operations, a predetermined time delay causing a delayed disappearance of the data file from the modification list may be employed. For example, in the process of writing a text document, frequent intermediate save operations may be performed, followed by renewed editing operations a few seconds or fractions of a second following an intermediate save operation. In this case, the time delay for a clearance of the modification indicator or a removal of the modified document from the modification list may be set to a time delay in the range of 1 second, in order to avoid the frequent removals and reappearances of the file in the modification list as indicated above. It is noted that, while the above example is described in reference to a text document, any other data file may be employed.

Upon receiving an indication from the modification list, indicating that the data file was modified, a log unit may obtain an identifier of the respective data file and may include the identifier of the modified file in the modification list. The modification list may be any data file or memory area for storing information related to modified files, for example, identifiers of the modified files or any other information related thereto. The modification list may include, or may be associated with, this file or memory area storing the identifiers or other information related to the modified files. Thus, the modification list is a resource, maintained by, e.g., a log unit, which includes information enabling a user to identify modified files.

The log unit, upon receiving an identification that a data file has been saved, leading to a clearance of the modification indication, may remove the identifier or other information of the respective file from the modification list. Accordingly, the modification list, for example, may provide a clear indication of all files presently in a state of being modified.

The modification list may be visualized on a display unit, enabling a user to view all modified files. For this purpose, the modification list may include identifiers of the files such as file names or other identifiers enabling a clear identification of the corresponding file.

The log unit may be configured to order the entries in the modification list. For example, the log unit may categorize the modified files in accordance with a type of document, such as a text document, video information, image information, or graphic information. Further, the log unit may arrange the entries in ascending or descending order in accordance with time of modification. Categorization according to type of document and ordering in accordance with time of modification may also be combined.

The modification list may be displayed in a frame on a display unit of the system or may be displayed as a tool-bar, for example, on top or at the bottom of a display screen. The log unit may be configured to maintain the modification list active, even if a corresponding window on a display unit is terminated, for example, through user interaction.

It is further noted that the above described elements and/or operations for handling a plurality of data files, including a detection of a modified file and maintaining a modification list may at least partially be realized as software or hardware. Thus, controls may be carried out using dedicated hardware or a correspondingly programmed data processing device or a group of data processing devices.

Further, it is noted that a computer-readable medium may be provided having a program embodied therein, wherein the program causes a computer or a system of data processing devices to execute functions or operations of the features and the elements of the above described examples. A computer-readable medium may be a magnetic or optical or tangible medium on which a program is recorded. Further, a computer program product may be provided comprising the computer-readable medium.

According to another example, a user or another application may keep track of data files modified during a work session. This work session may take place on a single data processing device accessing data files stored internally or externally.

At least one modified file is detected, which was modified since a last save operation. As described previously, a modification may include any kind of modification to a data file, such as an editing operation of a text document, for example, through keyboard input, or any other kind of user interaction. Further, a modification may be effected through another application, for example, an application handling a file and modifying this file, for example, through automatic access and modification of an entry in a database.

The modifications may be detected, for example, upon writing modification data into an internal buffer, the buffer being configured to store the modification of a data file prior to the save operation. Thus, if data are written into the modification buffer, a detection unit may detect the occurrence of a modification to the file. Alternatively, a modification may be indicated upon a certain type of modification operation or a modification operation in a certain part of the file.

When a modification to a file is detected, a modification indicator may be set, indicating to other elements of a system for handling files, a notification of a modified file.

If the modified file is stored, the modification indicator could again be cleared, indicating that the respective file was not modified since the last save operation.

A save operation may involve writing modification data held in a modification buffer onto a storage location storing the file. The original version of the file is thus overwritten by the modified version of the file, and, if the modification information is not intermediately stored, the file may not be recovered.

Thereafter, a modification list is maintained with an identifier for each of the at least one modified data file detected previously. As previously described, the identifier may be a file name or any other information specifying the modified file, enabling a user or other application to identify and access the modified file.

The modification list may be presented to a user, notifying the user that there are modified files which may require further attention before closing down corresponding applications.

Additionally, the entries of the modification list may be associated with all modifications made to a corresponding file and thus may function as a history unit, facilitating handling the modifications to the file. For example, if a user accidentally terminates a frame displaying a data file being currently modified, the file, an identifier of the file, and all modifications may be maintained in association with the modification list. Modification data may, however, also be stored at any other location which is accessible upon a user's selection of the identifier of the respective file in the modification list. Accordingly, even if the part of the application displaying the file is being closed down, the modifications are available. If, at a later point in time, the user then chooses an option for handling the modifications, i.e., to discard or to save the modifications, the user may select the corresponding file in the modification list, whereupon the user may be provided with options to save the modifications, discard the modifications or resume modifying the file. Thus, the present example facilitates handling of files by enabling a user to decide how to handle modifications to a data file at any point in time as long as the modification list is accessible.

The modification list, including the modification data, may be maintained in a random access memory but may also be maintained on a permanent memory, enabling access to the modification list after a complete shut-down of a data processing unit. Upon resuming operations, the modification list may be reloaded from the permanent storage and may be displayed to a user, enabling the user to choose how to handle the modifications, as described above.

According to another example, files are generally handled or operated upon, i.e., generated, edited, or processed. This handling may include operations performed during a regular work session at a data processing system.

More specifically, the operations may include running text processing applications, graphics applications, any mathematical or scientific applications, communication applications, including distributed applications such as banking applications, or applications involving a browser for browsing through information on a communication network.

In association with these applications, any type of files may be generated, i.e., a text document may be written, a spreadsheet may be created, images may be generated or imported from other sources, and video sequences, or audio files or the like may be created.

Each of the above files may be stored in a memory location, such as a random access memory or a hard disc, including optical storage. Thus, the binary information included in the data files is stored at the respective locations, where it can be accessed upon demand. Modifications to the files occur if the binary information of the files is in some way altered or amended, i.e., by including amendments into a text document or by altering portions of a text document or other file. These modifications may be held in an intermediate memory instead of being directly saved to the storage location of the file, thus enabling a user to undo the modification operations. Thus, the storage area storing a file is not immediately modified upon a modification instruction; rather, the modification instruction is stored in an intermediate storage area. Nevertheless, a display of the file, i.e., a text document, will include the modifications to the file, even if the file itself is not yet physically changed. If, during handling the file with one of the applications described above, a user decides to accept the modifications and wishes to save the file, the user may enter a corresponding command, upon which the modifications will be inserted into the file, i.e., the binary information at the physical storage location will be physically modified.

During a period between the commencement of file modification and file storage, the file is in a modified state. If a part of an application displaying the file including the modifications is terminated or discarded while the file is in the modified state, the modifications to the file may be lost unless it is known that the file is being modified, and the user is accordingly notified. This task is accomplished by the example described below.

It is determined whether a current data file was saved since a last modification operation. If the decision is YES, i.e., the data file was saved since a last modification operation, a continuation of the handling operations of the current data file is permitted. If the decision is NO, indicating that the data file was not saved since a last modification operation, an identifier of the modified data file is stored in a modification list.

The identifier of the data file included in the modification list may be associated with a link to the modified file. Accordingly, the modification list may only include an address of the storage location of the modified file. This may include an address of the file in the form presently at the form of the last saving operation at an address of a storage location storing the modification data.

Thus, the modification list, as described previously, keeps track of all modified files which were not saved since a last modification operation. By maintaining this information, even if a user or other application handling the file is not any longer aware that the file was modified, for example, if a display frame was terminated or discarded, information regarding the modified files is maintained in the modification list. This enables a user or any other application handling the file to decide how to handle the modifications at a later point in time, i.e., storing the modifications, discarding the modifications, or resuming editing operations.

The modification list may be presented to the user, or corresponding information of the modification list may be transmitted to an application handling the file. If the modification list is, for example, displayed on a display unit of a client unit operated by the user, the user may view all files which are in the state of being modified, regardless of whether the files are currently visible on the display, or whether they have been discarded.

According to another example, a modification list, i.e., as described previously, is displayed in a subframe on a display of a system. A display may be subdivided into frames wherein each frame may display information in relation to a particular operation, such as information associated with a particular application or file. A frame may be used to display the modification list in a similar manner as other subframes on the display. This may include general options for displaying the subframe of the modification list, i.e., size specification, resizing operations, font type, and color. This may include an option to close the subframe displaying the modification list, however, without permanently terminating a corresponding process. At a later point in time, the frame with the modification list may again be opened after a corresponding user input and may again display the list of modified documents.

It is further determined, in connection with the subframe of the modification list, whether the visualization of a menu allowing further user options is requested.

If the decision is NO, indicating that no menu display is requested, a display of the modification list in a subframe of the display continues.

If the decision is YES, indicating that the user requests display of a menu allowing further user options, user options for handling the modifications to a particular document in the modification list are displayed. The menu may, for example, be requested by a corresponding selection of a menu tag displayed in the subframe of the modification list or by any other means.

The user options may include at least one of saving the modified data file, discarding the changes of the modified file, discarding the entire modified file, and continuing to modify the file. If the option of saving the modified file is selected, then the modifications to the file are saved. This will usually be selected if the user is satisfied with the modifications and wants to permanently store the modifications.

If the option of discarding the changes of the modified file is selected, then the modifications are discarded, and the file remains in the state it was in when it was last saved. If the option of discarding the entire modified file is selected, then the file is deleted from a memory area where it has been kept until a decision was made. This option may be selected when the user decides that the entire modified file is no longer needed.

If the option of continuing to modify the file is selected, then modification operations with the file are resumed. This option may be chosen if the user wants to again display the modified file, particularly if a corresponding display frame was previously terminated and the user now wishes to resume modifying the file. This option may include undoing at least some of the previous modifications, prior to selecting the continue modifying option, and may include introducing further modifications.

The present example provides a user with convenient options for handling modified data files without running the risk of unintended loss of modification information upon accidental termination instructions with regard to a part of an application display of the file.

In a distributed environment it may be important to maintain information on modified data files as described previously, as in distributed environments which include the execution of distributed applications, all or some parts of the system may not always be aware of all modified documents. Thus, particularly in a distributed environment, maintaining a modification list including all modified documents is useful for providing a user with options for handling modified.

It is assumed for the following discussion that a text document is handled by a text processing application. It is noted that any other data file type and application may be used instead. However, it is not intended that the present invention be limited in this manner.

The text processing application may be located at a server, while the text document is displayed and handled at a client. For displaying and handling the file an application cooperating with the text processing application may be provided at the client. This visualization and handling application may be realized by a browser application or any other handling application residing at the client.

As an example, in the following discussion, it is further assumed that a display and handling application executed at the client is a browser application. As discussed previously, a browser application may be any program or group of application programs allowing convenient browsing to information or data available in distributed environments such as on the Internet or any other network including local area networks. A browser application generally enables viewing, downloading data, and transmitting data between data processing devices. Further, a browser application, appropriately configured or equipped with appropriate application modules, or plug-ins, may be enhanced with further functionality to access or process specific kinds of information available in a distributed system such as text documents, video information, audio information or any other kind of information in specialized formats.

A plug-in may generally be a software module which may be added to any kind of hosting software application, such as a browser application, the above exemplary text processing application or any other service application. A plug-in adds a defined functionality to the hosting software application, for example, visualization capabilities for certain types of documents or specific processing capabilities. A plug-in may be added to the hosting software application at any desired time, provided that the hosting software application is equipped to receive and integrate the plug-in. The code for the plug-in may be obtained from any source, such as via a computer network or from a data storage medium. Alternatively, a plug-in may also be a hardware unit adding functionality to an application or hosting hardware structure.

A browser application may be used to view the text document of the above example. This could be achieved by clicking on a link in a browser frame, the link including an identifier of the text document. In this case, if the browser is equipped with the appropriate remote visualization protocol or runtime environment component service, the data file may be retrieved from an arbitrary storage location, appropriately rendered by the text processing application located at the server, and displayed at the client in a browser frame on a display.

A remote visualization protocol or runtime environment component service to ensure convenient access from a first computer system to resources available at a second computer system may, in the present example, be any application or group of applications or modules which enable a user at a client to communicate with a server and view information provided by the server. For example, a remote visualization protocol or runtime environment component service may enable a user to connect to the server, to control the execution of an application such as the above exemplary text processing application at the server and to view processing results such as an edited text document. A remote visualization protocol or runtime environment component service may cooperate with a browser application to provide the above functionality.

An exemplary runtime environment component service is disclosed in the European patent application EP01100136.9, entitled "Runtime Environment Component Services" and filed Jan. 15, 2001, which is hereby incorporated herein by reference in its entirety.

Thus, if the browser is equipped with the appropriate remote visualization protocol or runtime environment component service and/or extension programs, for example, plug-ins, a user may be enabled to view and modify the data file displayed in the subframe on the display. For editing purposes, a user may locate a cursor at a desired text location and enter characters through a keyboard. Modifications to the data file may then be displayed at the client, i.e., in the subframe displaying the file. The modifications could further be stored locally at the client or at the server in association with the file, and unless a save operation occurs, the original form of the file may be maintained. Accordingly, a user editing the text document of the above example may view, through use of a browser, the text document in the modified form and may further be enabled to undo previous modifications or redo previous modifications.

In such a browser environment, operations associated with editing the document may be terminated as a result of a user action. The browser application or other handling application may then unload any associated additional software such as plug-ins and may terminate a frame on the display. Since the browser application or other handling operation may not be aware of the fact that a file such as the above text document was still being modified without the modifications having been saved, the user may be unable to specify whether the modifications should be saved or discarded.

Conventionally, presenting such saving, discarding, or canceling options in a browser and plug-in environment may not be possible, since a conventional communication between the browser and the plug-in does not present such an option. Thus, if the user loads a new page into the browser, i.e., a new data file or information element, or reloads a previously loaded page again, such as the page corresponding to the text document, or completely closes the browser frame, there is the potential threat that at least part of the modification work will be lost.

However, according to the present example, as also indicated in the previously described examples, files may be handled without risking loss of at least part of any modifications which were introduced.

According to another example, a client side detection module and a server side detection module are provided for tracking all modified documents. Both modules provide the required functionality for detecting any modifications or specific modifications, as described above.

As discussed previously, a log unit may be located entirely at the client side or at the server side, i.e., corresponding functionality may be realized entirely at the client side or server side. The client side log module and the server side log module may be configured to realize the functionality of the log unit as described previously. All modified documents, or more specifically identified modified files, may be included in the modification list.

Although the modification list may be part of the server, it may also be located at the client or at any other location. Further, the client and/or the server may include distributed data processing devices. For example, a plurality of servers may be configured to cooperate with a plurality of clients. Further, a plurality of users operating a plurality of clients may access a plurality of servers to obtain services as described above.

The files may be located at an arbitrary location, accessible by the client and/or the server. As described previously, the files may also be located on a plurality of devices, i.e., in a communication network such as the Internet or a local area communication network.

During operation, each modified document may be included in the modification list, as described previously. However, it is also possible that a modified document is only then included in the modification list if a corresponding display frame at the client unit is terminated. Thus, documents which are currently visible or still actively accessible at the client may not be displayed in the modification list.

Each document in the modification list may be selected, and options may be presented to a user or any other application handling a file, to either save the modifications, discard the modifications or continue editing, in which case the file will again be opened in a display frame at the client.

The identifier in the modification list specifying a modified document includes a file name of the modified data name, for convenient reference. Further, the identifier may be associated with a link to the modified data file, i.e., a link to the data file and/or the intermediately stored modifications. This link to the modified file may include a URL (Uniform Resource Locater), and thus Internet protocols may be used for accessing the file.

The example described above enables improved handling options for files in a distributed environment, allowing a user to decide how to handle modifications at virtually any arbitrary point in time.

According to another example, a client waits for an instruction to end a session between a client and a server. This could be a log out instruction specifying that a user wants to close down a connection from the client to the server. Further, the client waits for an instruction to exit a subframe displaying the modification list. Such an instruction could involve terminating a subframe on a display displaying the modification list.

If the decision is YES, indicating that a log out or exit instruction is detected, the user is prompted for input of one of the options of saving the modifications of the modified file, discarding the modifications of the modified file, and resuming modifications of the file. If the user selects the option of saving the modifications of the modified file, the modifications will be written to a memory area of the file. If the user selects the option of discarding the modifications of the modified file, the file will be maintained in the original form, i.e., the form of the file when the last save operation was performed. If the user selects the option of resuming modifications of the file, the file will again be displayed at the client in a subframe or browser frame on the display, thus enabling the user to continue editing, including undoing or redoing modifications to the file.

The user options may be displayed in yet another subframe on the display with selectable buttons corresponding to the respective options.

The present example avoids a loss of modifications, or correspondingly, the forced storage of modifications to the files upon a log out instruction initiated by a user being unaware of the existence of modified files. The communication session may thus come to a defined end, with all modifications being either saved or discarded.

According to another example, a terminate instruction with regard to a subframe displaying a modified document is monitored. For example, a user in the process of modifying a file in a subframe displayed at a client display could enter a terminate instruction by actively canceling a subframe displaying the modified document. If the subframe is used in connection with a browser application, as described previously, the user may move back or forward in a page history, which would also lead to an equivalent of a terminate instruction, as upon a forward or reverse scrolling operation to pages, each page which is not active is terminated.

It is then determined whether a terminate instruction occurred. If the decision is YES, indicating that a terminate or discard instruction occurred, a subframe display of the modification list is maintained active. Accordingly, the modification list continues to be displayed on a display at a client as described previously. If thereafter the user selects the current file, for example, a modified document in the modification list, a subframe with the modified file may be opened again at the client.

Thus, the present example enables maintenance of a subframe with the modification list active if a subframe of a client displaying the modified data is discarded, and the opening of a subframe with the modified file again at the client upon a selection of a link to the modified file in the modification list.

Figure 5A:
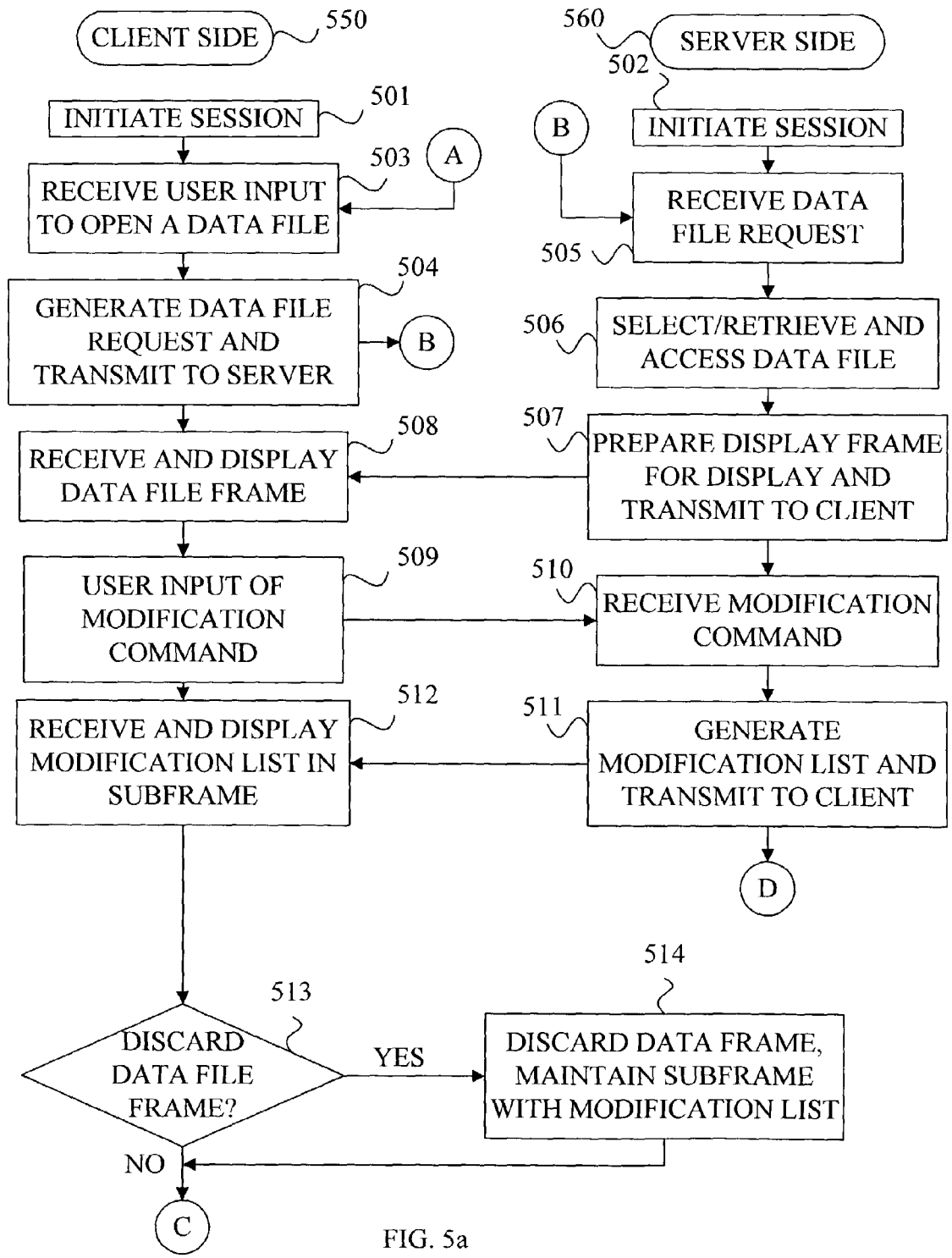
FIGS. 5a–5b depict a flowchart of steps performed by a client and a server for handling a plurality of files, particularly showing exemplary operations for a client and server scenario.
Figure 5B:
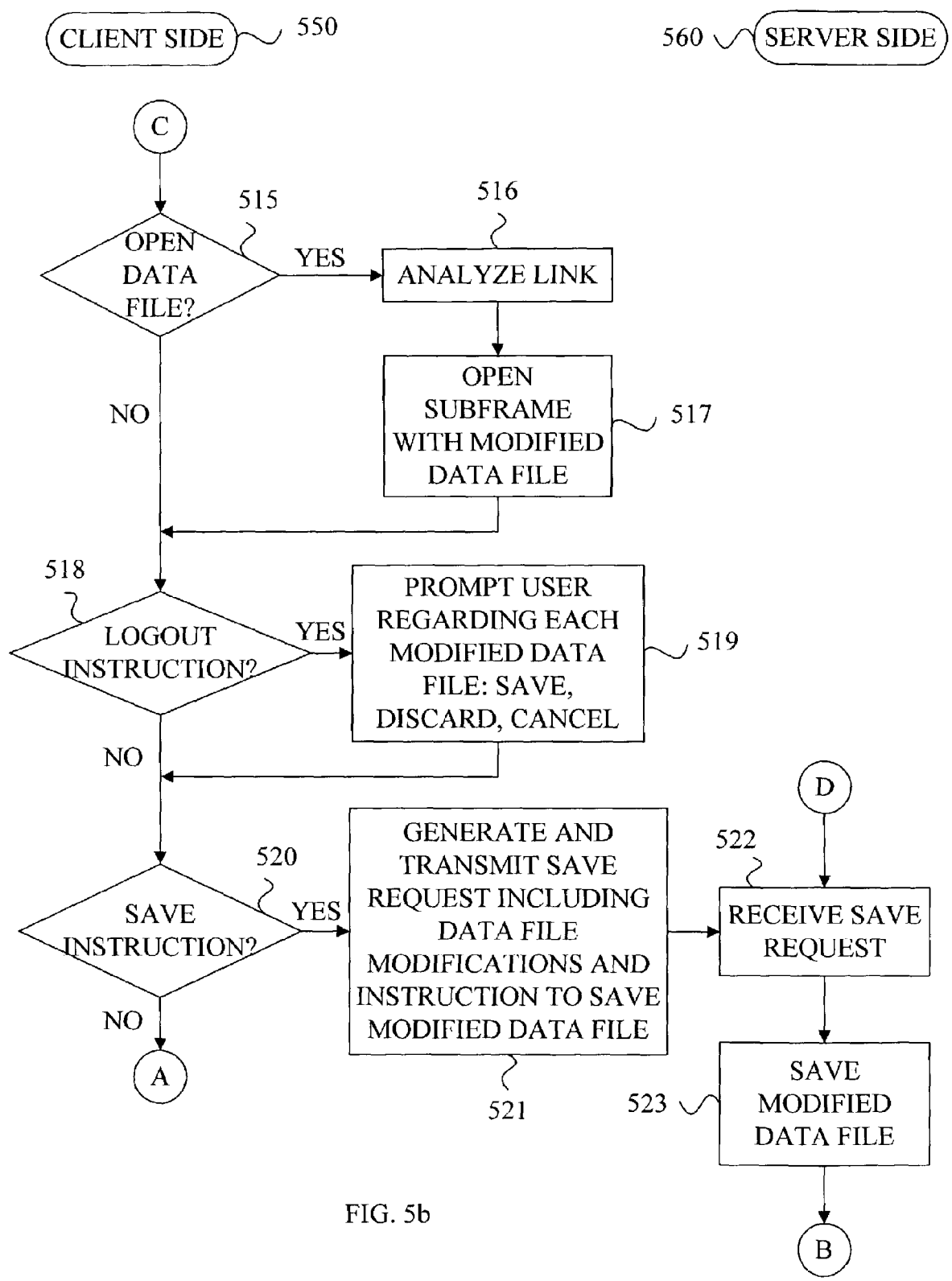

FIGS. 5a–5b depict a flowchart illustrating steps performed on a client side 550 and on a server side 560 in a data processing system for handling a plurality of data files which may be performed in a client and server scenario. The operations shown in FIGS. 5a–5b may be performed using the system shown in FIG. 3; however, the operations of FIGS. 5a–5b are not limited thereto.

In steps 501 and 502 at the client side 550 and at the server side 560, respectively, the plug-in 362 of the browser 360 and the service application 322 initiate a communication session. This may be accomplished, for example, by establishing a communication link through a communication network such as the Internet. After the communication session between the client side 550 and the server side 560 is established, in step 503 the browser 360 on the client side 350 receives a user input to open a file. The file, as described previously, may be a text document which is intended to be modified. The file may be located at the server side 560, such as file 309, and thus may not be locally available at the client side 550.

In step 504, at the client side 550 the plug-in 362 generates a file request and transmits the request to the service application 322 at the server side 560 over the communication link, and the service application 322 receives the file request at the server side 560 in step 505.

In step 506 the service application 322 selects the file 309 based on information contained in the file request, and the file is retrieved and accessed.

In step 507, the visualizer 335 at the server side 560 may prepare an appropriate display frame for display at the client 550 and transmit the frame to the plug-in 362 or the client application 372 at the client side 550. The display frame may provide the text document in an appropriate size and resolution, adapted to the display capabilities of the display 355 at the client side 550. In step 508, the plug-in 362 or the client application 372 at the client side 550 receives and displays the file frame. This may include displaying the frame on a display such as the display 355, as described previously.

In step 509, the user, at the client 550, inputs a modification command, for example, an editing command which is transmitted to the server 560, by the plug-in 362 or the client application 372. The modification command may include amending or modifying the text document, such as the document 330, as described previously.

In step 510, the service application 322 at the server side 560 receives the modification command, and in step 511 the service application 322 generates the modification list 328 at the server side 560, as described previously. The modification list 328 may include an identifier of the file 309, including a link to the file 309. The service application 332 transmits the modification list 328 to the client 550.

In step 512, the client application 372 at the client side 550 receives the modification list 328 and displays the list in a subframe on a display, such as the display 355 at the client side 550.

It is noted that, while in the present example it is again assumed that the file is a text document, any other file type or application may be used. Further, while in the present example it is assumed that the modification list 328 is generated at the server side 560, it is also possible that the modification list 328 is generated at the client side 550. Additionally, while in the present example it is assumed that the file 309 is accessed at the server side 560, it is also possible that the file 357 is accessed directly from the client side 550.

In step 513, the plug-in 362 at the client side 550 determines whether a file frame terminate operation occurs. If in step 513 the decision is YES, indicating that a file frame terminate command occurred, the browser 360 discards the file frame, while the client application 372 maintains the subframe with the modification list 328 active. Thus, even if a file frame is discarded through browser operation or a direct instruction from a user, the modification list 328 is still available, enabling the ability to further manage the modifications.

If in step 513 the decision is NO, indicating that a terminate frame instruction did not occur, in step 515 the plug-in 362 determines whether the user input a command for opening a file.

If in step 515 the decision is YES, indicating that the user input a command to open a file, for example, by clicking on an identifier of one of the files in the modification list 328 displayed at the client 550, then in step 516, the client application 372 analyzes a link associated with the identifier, for example, a URL, at the client side 550.

Thereafter, in step 517, the client application 372 opens a subframe with the modified file and displays the modified file on the display 355 at the client side 550. While in the present example it is assumed that the client application 372 analyzes the link in step 516 at the client side 550, it is also possible that the link is analyzed at the server side 560, and that the opening of the subframe with the modified file is handled at the server side 560.

If in step 515 the decision is NO, indicating that a file opening command did not occur, in step 518, the plug-in determines whether a logout instruction occurred on the client side 550.

If in step 518 it is determined that a logout instruction occurred, in step 519, the client application 372 prompts the user regarding each modified file to indicate whether to save, terminate or cancel operations, as described previously.

If in step 518 the decision is NO, indicating that a logout instruction did not occur, the plug-in 362 determines in step 520 whether the user entered a save instruction. If in step 520 the decision is YES, indicating that a save instruction was entered, the client application 372 generates a save request and transmits the request to the service application 322 at the server side 560, the request including file modifications and an instruction to save the modified file. Alternatively, it is also possible that only a save request is transmitted to the server side 560, for example, if modifications of the file are already maintained at the server 560, such as in the document 330.

In step 522 the service application 322 at the server side 560 receives the save request and the modified file is saved, i.e., the modifications are written to the file 309 in step 523. Thereafter, the flow of operations returns to step 503 at the client side 550 and to step 505 at the server side 560, respectively.

It is noted that the above operations are only exemplary, and that different sequences or further operations may be used.

According to another example, it is assumed that a subframe with the modification list is displayed at a data processing system or a client. This displayed subframe may be a floater window, i.e., a window associated with an application program such as a browser application or any other application for handling modification of a data file. Such an application or browser may be an application which can be independently launched or terminated. For example, the floater window may be a window maintained by a browser application such as a sub-window depending on a process in correspondence with the browser application. If the browser application is terminated, the floater window would also be terminated.

It is determined whether a terminate instruction occurs. The terminate instruction, as described previously, may occur in connection with an explicit terminate instruction from a user or may, implicitly, occur with a user moving forward or backward in a browser.

If the decision is YES, indicating that a terminate or discard instruction occurred, two options are presented. First, a user may be prompted to input an instruction regarding one of saving the modifications of the modified file and discarding modifications of the modified file. These user options may be presented through specific software included in the browser application such as plug-ins or java applets. If inclusion of specific software extensions is undesirable, as a second alternative, all modified documents may be saved at a separate memory location. Thus, if further software tools for the floater window are undesirable, by default modified documents may be saved in a separate memory area. Alternatively, only the modifications and exact information with respect to all modification operations may be saved. Thus, the document in the original form and the modification information is maintained.

Thereafter, it is determined whether a restart instruction occurs. If a restart instruction did not occur, waiting continues for a restart instruction. If a restart instruction is entered, for example, a power button is pressed, a modification list is again generated including all modified documents, including the modified documents previously saved by default.

Accordingly, the present example enables display of a subframe with the modification list as a floater window or browser window and execution, upon a terminate instruction, of one of saving modifications of the modified data file and discarding modifications of the modified data file.

Thus, the system may be configured, for example, by the user, to save all modifications by default upon receipt of a terminate instruction, or to discard all modifications by default. Accordingly, even if the modification list is displayed in a floater window, or a browser window, i.e., a window which is associated with an application program and thus shares the fate of the application program, the user or other instance may still pre-define a default save operation or a default discard operation of modifications upon removing the modification list or application program.

Further, as an alternative thereto, all modified documents may be saved upon a detection of a terminate instruction in a separate memory area and upon a later restart, operations of modified documents may again be included in a modification list.

Accordingly, even if a computer is shut down, loss of modifications may be avoided. Further, the user may thus decide at a later point in time, e.g., after re-establishing communications, to save or discard modifications.

According to another example, a subframe with a modification list is displayed as a system window. The modification list has been described previously. The system window is a window associated with an operating program, i.e., operating a client as described previously. Thus, the modification list is presented on a system level, allowing provision of specific software tools for handling modifications upon receipt of a terminate instruction.

It is determined whether a terminate or discard instruction occurs. If the decision is YES, indicating that a terminate instruction occurred, the user options of saving all modifications of the modified file, discarding all modifications of the modified file, and resuming modifications to the file may be presented, the options having functionality corresponding to the functionality described previously.

The present example enables a defined closing, operational upon a terminate instruction associated with the modification list, since the modification list is displayed as a system window maintained by an operating system such as an operating system for the system.

The above example shows that the application is well suited for network based implementation, such as in a system for providing a remote processing server for users.

It is noted that the above elements of the above examples may be at least partially realized as software and/or hardware. Further, it is noted that a computer-readable medium may be provided having a program embodied thereon, where the program is to make a computer or system of data processing devices execute functions or operations of the features and elements of the above described examples. A computer-readable medium may include a magnetic or optical or other tangible medium on which a program is embodied, but can also be a signal, (e.g., analog or digital), electromagnetic or optical, in which the program is embodied for transmission. Further, a computer program product may be provided comprising the computer-readable medium.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A method in a data processing system having a browser, a client application, and a service application, the method comprising the steps of:

displaying, by the browser, contents of at least one of a plurality of files in a window;

receiving, by the browser, user input including modifications to the at least one of the plurality of files;

transmitting, by the browser to the service application, the user input including modifications to the at least one of the plurality of files;

receiving, by the browser, an indication of a termination of the execution of the window;

determining, by the service application, which of the plurality of files have been modified and not saved;

generating a list of the determined files by the service application and sending the list to the client application;

receiving the list by the client application; and displaying the list to the user to enable the user to save at least one of the determined files, wherein the list is displayed after termination of the window and before termination of a connection between the client application and the service application.

2. The method of claim 1, wherein the step of displaying the list to the user includes displaying the list to the user to enable the user to save at least one of the determined files by displaying at least one file update option for the at least one of the determined files, the at least one file update option including at least one of saving the at least one of the determined files with the modifications, deleting a version of the at least one of the determined files that was previously saved, displaying the at least one of the determined files for further user input to modify the contents of the at least one of the determined files, and closing a previously saved version of the at least one of the determined files.

3. The method of claim 2, further comprising the step of receiving, by the client application from a user, a selection of one of the at least one file update option for the file.

4. The method of claim 3, further comprising the step of transmitting to the service application, by the client application, the selection of one of the at least one file update option for the at least one of the determined files.

5. The method of claim 1, further including the step of initiating execution of a window in the browser, by a user requesting access to the at least one of the plurality of files.

6. The method of claim 5, wherein the step of initiating execution of the window in the browser further includes initiating execution of a window in the browser, by a plug-in in response to a user request for access to the at least one of the plurality of files.

7. The method of claim 6, wherein the step of displaying the list to the user further comprises displaying, by the client application, the list to the user to enable the user to save the determined files, after termination of the execution of the window.

8. The method of claim 1, further comprising the steps of:

receiving, by an event detector associated with the service application, an indication of a termination of execution of a window of the browser;

receiving, from the event detector, by a determination module associated with the service application, a message indicating the termination of the execution of the window.

9. The method of claim 1, wherein the service application is located on a server and the client application is located on a client device which is remote from the server.

10. The method of claim 1, wherein the service application and the client application are located on a common data processing device.

11. A method in a data processing system having a browser, the method comprising the steps of:

transmitting data for displaying contents of a file in a window of the browser such that the contents of the file are reflected by the displayed contents;

receiving input through a connection from a user to modify the contents of the file such that the contents of the file no longer are reflected by the modified displayed contents;

receiving an indication that the window is closing when the contents of the file no longer are reflected by the modified displayed contents; and transmitting data for displaying an indication that the contents of the file no longer are reflected by the modified displayed contents, after receiving the indication that the window is closing and before the connection is terminated.

12. The method of claim 11, wherein the step of transmitting data for displaying the indication further comprises transmitting data for displaying the indication that the contents of the file no longer are reflected by the modified displayed contents and at least one file update option for the file.

13. The method of claim 12, wherein the step of transmitting data for displaying the indication further comprises transmitting data for displaying the indication that the contents of the file no longer are reflected by the modified displayed contents and at least one file update option for the file, the at least one file update option including at least one of saving the file with the modified displayed contents, deleting the file, displaying the modified display contents for further user input to modify the contents of the file, and closing a previously saved version of the file.

14. The method of claim 11, wherein the method is performed by a service application including at least one of a text processing application, a graphic application, and a spreadsheet application.

15. A data processing system having a browser, the data processing system comprising:

means for transmitting data for displaying contents of a file in a window of the browser such that the contents of the file are reflected by the displayed contents;

means for receiving input through a connection from a user to modify the contents of the file such that the contents of the file no longer are reflected by the modified displayed contents;

means for receiving an indication that the window is closing when the contents of the file no longer are reflected by the modified displayed contents; and means for transmitting data for displaying an indication that the contents of the file no longer are reflected by the modified displayed contents, after the window has closed and before the connection is terminated.

16. A data processing system for managing modified documents and having a browser, the system comprising:

a memory comprising a document management system that transmits data for displaying contents of a file in a window of the browser such that the contents of the file are reflected by the displayed contents; receives input through a connection from a user to modify the contents of the file such that the contents of the file no longer are reflected by the modified displayed contents; receives an indication that the window is closing when the contents of the file no longer are reflected by the modified displayed contents; and transmits data for displaying an indication that the contents of the file no longer are reflected by the modified displayed contents, after the window has closed and before the connection is terminated; and a processor for running the document management system.

17. The data processing system of claim 16, wherein the document management system further transmits data for displaying the indication that the contents of the file no longer are reflected by the modified displayed contents and at least one file update option for the file.

18. The data processing system of claim 17, wherein the document management system further transmits data for displaying the indication that the contents of the file no longer are reflected by the modified displayed contents and at least one file update option for the file, the at least one file update option including at least one of saving the file with the modified displayed contents,
deleting the file,
displaying the modified display contents for further user input to modify the contents of the file, and
closing a previously saved version of the file.

19. A tangible computer-readable medium storing instructions that cause a data processing system having a browser to perform a method comprising the steps of:

transmitting data for displaying contents of a file in a window of the browser such that the contents of the file are reflected by the displayed contents;

receiving input through a connection from a user to modify the contents of the file such that the contents of the file no longer are reflected by the modified displayed contents;

receiving an indication that the window is closing when the contents of the file no longer are reflected by the modified displayed contents; and transmitting data for displaying an indication that the contents of the file no longer are reflected by the modified displayed contents, after the window has closed and before the connection is terminated.

20. The computer-readable medium of claim 19, wherein the step transmitting data for displaying the indication further comprises transmitting data for displaying the indication that the contents of the file no longer are reflected by the modified displayed contents and at least one file update option for the file.

21. The computer-readable medium of claim 20, wherein the step of transmitting data for displaying the indication further comprises transmitting data for displaying the indication that the contents of the file no longer are reflected by the modified displayed contents and at least one file update option for the file, the at least one file update option including at least one of saving the file with the modified displayed contents,
deleting the file,
displaying the modified display contents for further user input to modify the contents of the file, and
closing a previously saved version of the file.

22. The computer-readable medium of claim 20, wherein the method is performed by a service application including at least one of a text processing application, a graphic application, and a spreadsheet application.

* * * * *